United States Patent [19]

Woodle, IV et al.

[11] Patent Number: 4,921,059
[45] Date of Patent: May 1, 1990

[54] LOAD CELL BLOCK AND METHOD OF MANUFACTURING THE SAME

[75] Inventors: Allan S. Woodle, IV, Bellevue; Marcell N. Benoit, Mountlake Terrace, both of Wash.

[73] Assignee: Lodec, Inc., Lynnwood, Wash.

[21] Appl. No.: 341,707

[22] Filed: Apr. 21, 1989

[51] Int. Cl.[5] .................... G01G 3/14; G01G 19/08; G01L 1/22

[52] U.S. Cl. .................... 177/211; 177/136; 73/862.65

[58] Field of Search .................... 177/136, 211; 73/862.65, 862.66

[56] References Cited

U.S. PATENT DOCUMENTS

| 3,135,112 | 6/1964 | Farley | 73/862.65 X |
| 3,642,081 | 2/1972 | Hebert | 177/211 X |
| 3,661,220 | 5/1972 | Harris | 177/136 |
| 4,020,911 | 5/1977 | English et al. | 177/136 |
| 4,095,659 | 6/1978 | Blench et al. | 177/136 |
| 4,210,216 | 7/1980 | Godden | 177/134 |
| 4,423,793 | 1/1984 | Caris | 177/211 |

FOREIGN PATENT DOCUMENTS 3614989 11/1987 Fed. Rep. of Germany ...... 177/211

Primary Examiner—George H. Miller, Jr.
Attorney, Agent, or Firm—Christensen, O'Connor, Johnson & Kindness

[57] ABSTRACT

An improved load cell block (40) having a pair of slots (56) extending inwardly from first and second ends (46 and 48) to form an upper pair of beams (58), a lower pair of beams (60) and a central portion (62). The lower wall (66) of the slots (56) have a groove (72) formed therein for concentrating bending forces in the lower beams (60). The slots (56) terminate at an end wall (68) that is comprised of a bore (52) formed by drilling to have machining marks that are lateral to the longitudinal axis of the block to reduce the formation of stress cracks.

10 Claims, 1 Drawing Sheet

LOAD CELL BLOCK AND METHOD OF MANUFACTURING THE SAME

TECHNICAL FIELD

The present invention pertains to strain gauge instrumented load cell blocks, and, more particularly, to an improved double-ended bending beam load cell block having predetermined areas of bending force concentration, and method of making the same.

BACKGROUND OF THE INVENTION

Load weighing systems, and, in particular, weighing systems for vehicles such as logging trucks and trailers, typically use a plurality of load cell assemblies to monitor the weight added to the trucks and trailers. Load cell assemblies usually include a machined steel block that is supported between load-carrying members, such as log supports, and mounting members, such as truck or trailer frames. In each block there are formed slots which serve to direct the load to a predetermined area.

FIG. 1 illustrates a prior art load cell block 10 supported between a load-carrying member 12 and a mounting block 24, which is welded to a mounting member 14 attached to a trailer frame 16. The load cell block 10 has formed therein first and second end slots 18, which serve to direct the load applied by the load-carrying member 12, attached to a top beam 20, to a central portion 22, and thence to bottom beams 23, which support the central portion 22 above the mounting blocks 24. The amount of stress in the bottom beams 23 is measured by strain gauges (not shown) located along the lower surface 25 of the bottom beams 23. While this type of load cell block has proved to be highly accurate and reliable, it has been subject to a number of malfunctions resulting from cracks 28 that form at the terminal end 30 of the slots 18 when a severe load is applied, as indicated by the arrows 32.

It has been found that the stress cracks result from the formation of score marks in the terminal end 30 of the slots 18 when the slots 18 are formed by milling. In particular, the milling machine leaves lateral machining marks that serve as stress concentrations at the junction of the central body and the upper and lower beams. Thus, it is desirable to eliminate these machining marks to reduce the formation of the stress cracks. It has further been found that bending load forces can be directed to predetermined locations for strain gauges by forming lateral grooves at the predetermined locations on the block.

SUMMARY OF THE INVENTION

The present invention is directed to a method for making a block for use in a load cell assembly. The block has a first end and a second end. The method comprises the steps of drilling a pair of holes of a predetermined diameter in said block, the holes being perpendicular to the longitudinal axis of the block; and forming a pair of slots in the block that have an upper wall and a lower wall and that extend inwardly from the first and second ends to terminate at the holes, with each slot being formed to have a thickness between the upper and lower walls that is less than the diameter of the pair of holes.

In accordance with another aspect of the present invention, the method further comprises the step of reaming a smooth finish in said pair of holes to eliminate machining marks and reduce the formation of stress cracks.

In accordance with another aspect of the present invention, the step of forming said slot comprises sawing said block with a band saw.

In accordance with yet another aspect of the present invention, the method further comprises the step of forming a groove in each of said lower walls that is spaced a predetermined distance from and is parallel to said pair of holes.

In accordance with still yet another aspect of the present invention, the step of forming the groove in each of said lower walls further comprises the step of forming said grooves to have a smooth, arcuate cross-sectional shape.

In accordance with another method of constructing a block for use in a load cell assembly, the block having a first end and a second end, the method comprises the steps of drilling a first pair of holes of a predetermined diameter in said block that are perpendicular to the longitudinal axis of said block; drilling a second pair of holes of a smaller diameter than the predetermined diameter of said first pair of holes, said second pair of holes being spaced a predetermined distance to the outside of said first pair of holes and parallel to the first pair of holes; and forming a pair of slots in said block that have an upper wall and a lower wall and that extend inwardly from said first and second ends to intersect said second pair of holes and intersect and terminate at said first pair of holes, said slot having a thickness between the upper and the lower walls that is smaller than the predetermined diameter of said first pair of holes.

The present invention is further directed to an improved load cell for weighing systems having a load-supporting member and a mounting member. The improved load cell comprises an elongate block means having a first and second end and a slot extending inward from each of the ends to define upper and lower beams extending from a central portion. Each slot has an upper wall formed by the upper beam, a lower wall formed by the lower beam, and an end wall formed by the central portion. Each of the end walls further comprises a longitudinal bore perpendicular to the longitudinal axis of the elongate block means. The bore has a diameter greater than the thickness of the slot, which thickness is defined as the distance between the upper and lower walls. Ideally, the bore has a smooth finish that eliminates score marks to reduce the formation of stress cracks.

In accordance with another aspect of the present invention, groove means are formed in the lower wall of the slot at a predetermined distance from and parallel to the bore. The groove means concentrates bending forces along the lower beam at a predetermined location. Preferably, the groove means in each slot has a smooth finish to eliminate machining marks and a uniform arcuate cross-sectional shape to reduce the formation of stress cracks.

As will be readily appreciated from the foregoing description, the present invention involves a two-step process of drilling holes in predetermined locations in the block and then using a band saw to connect the holes to free the upper and lower beams extending from the central portion of the block. This process utilizes a thinner saw cut that creates thicker upper and lower beams, resulting in a much stronger load cell. Any machining marks that will be left in the holes will be formed perpendicular to the high stress area, thus eliminating stress cracks caused by fatigue. Furthermore, the placement of the second pair of holes a predetermined distance from the first pair of holes to create a groove in the lower wall when the slot is formed causes the bending forces to be concentrated at the groove to allow more precise measurement of the bending stress. With the present invention, the load cell block will have greatly lowered stresses while at the same time having a higher output and accuracy.

BRIEF DESCRIPTION OF THE DRAWINGS

The foregoing and other features and advantages of the present invention will be more clearly understood from the following detailed description when taken in conjunction with the accompanying drawings, wherein.

DETAILED DESCRIPTION OF THE PREFERRED EMBODIMENT

Figure 1:
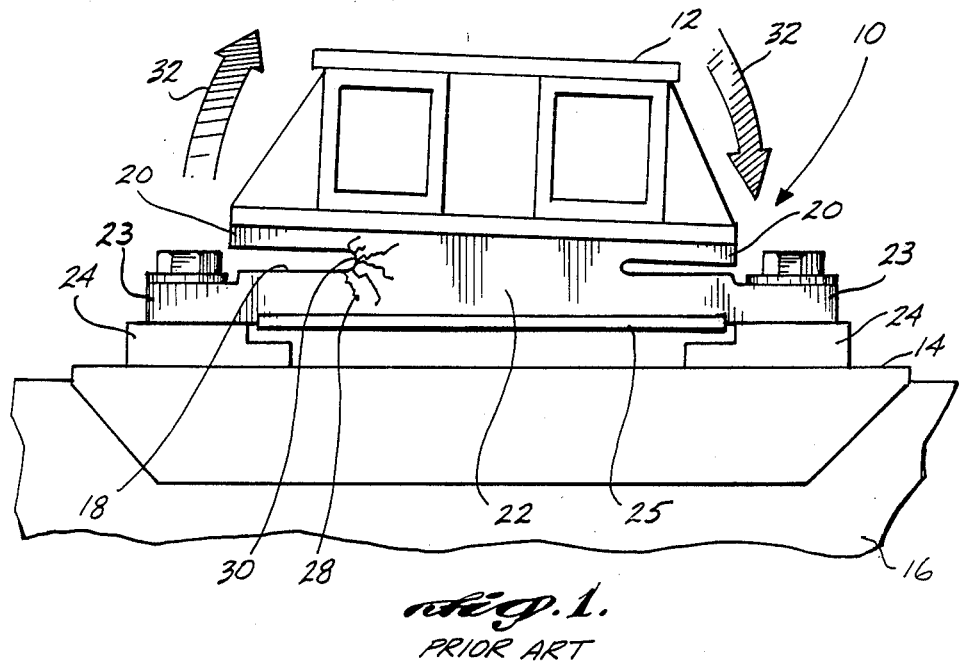
FIG. 1 is an illustration of a prior art load cell assembly.
Figure 2:
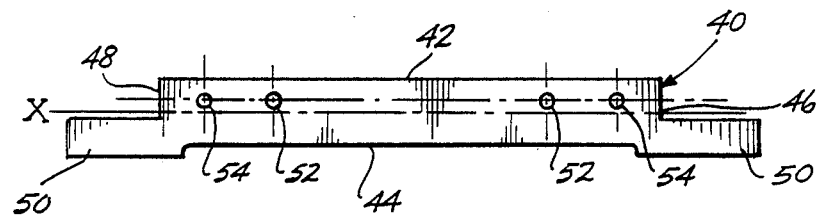
FIG. 2 is an enlarged side elevation of a load cell block illustrating the initial steps of the method of the present invention.

Referring initially to FIG. 2, the load cell block 40 comprises an elongate block of solid material, such as steel, having a longitudinal axis X, a top surface 42, a bottom surface 44, and first and second ends 46 and 48. A pair of legs 50 project laterally outward at the bottom surface 44 of the block 40. In accordance with the first step of the method of the present invention, a pair of holes 52 are formed in the block 40 to be perpendicular to the longitudinal axis of the block 40. The holes 52 have a predetermined diameter and are symmetrically positioned on the block 40. The holes are formed by drilling so that any marks made during drilling are formed parallel to the longitudinal axis of the block to reduce the creation of stress cracks when in use.

In the next step, a second pair of holes 54 are formed in the block 40 to be spaced equidistantly from and parallel to the first pair of holes 52 and lie in the same plane as the first pair of holes 52. The second pair of holes are shown having an identical diameter as the predetermined diameter of the first pair of holes. However, the second pair of holes may have a diameter that is different than the predetermined diameter of the first pair of holes, for instance, having a diameter that is less than the diameter of the first pair of holes. Preferably, the second pair of holes are formed by a drilling operation.

In the next step of the method, the first pair of holes are reamed to have a smooth finish that eliminates machining marks left from the drilling operation to further reduce the creation of stress cracks. Preferably, the holes 52 are reamed to a 32 microinch finish. Similarly, the second pair of holes 54 are also reamed to a 32 microinch finish.

Figure 3:
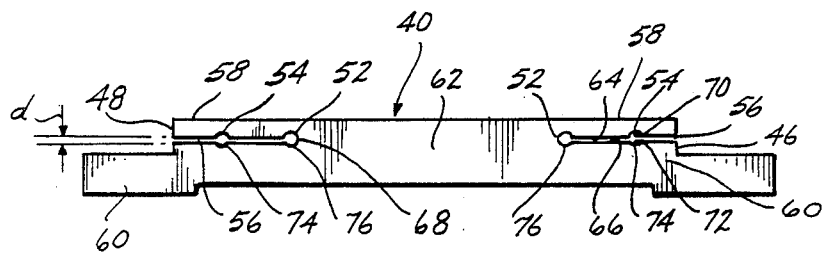
FIG. 3 is an enlarged side elevation of a load cell block illustrating the final steps of the method of the present invention.

Referring now to FIG. 3, the next step of the method of the present invention is the forming of a pair of slots 56 that extend inwardly from the first and second ends 46 and 48 of the block 40. The slots 56 pass through the center of the second pair of holes 54 and terminate at the first pair of holes 52. When so formed, the slots 56 define an upper pair of beams 58 and a lower pair of beams 60 that project outward from a central portion 62. As such, each slot 56 will have an upper wall 64 that is defined by the longitudinally extending surface of the upper beam 58, a lower wall 66 that is defined by the longitudinally extending surface of the lower beam 60, and a terminal end wall 68 that is defined by the central portion 62. In addition, the slots 56 will each have a thickness, d, that is the distance between the upper wall 64 and the lower wall 66.

While the slots 56 in the past have been formed by milling, it has been found that the milling operation leaves lateral machine marks in the terminal end wall 68 that enhance the formation of stress cracks. Consequently, the slots 56 of the present invention are formed with a band saw having a blade with a predetermined thickness that leaves a cut of thickness d, the thickness of the slots 56. Furthermore, the slots 56 intersect the center of the second pair of holes 54 and the first pair of holes 52 such that an upper groove 70 is formed in the upper wall 64 and a lower groove 72 is formed in the lower wall 66 of each slot 56. The upper and lower grooves 70 and 72 are formed because the slot thickness d is selected to be less than the diameter of the second pair of holes 54 and the first pair of holes 52. In addition, the terminal end wall 68 has a smooth, arcuate cross-sectional shape as do the cross-sectional shapes of the upper and lower grooves 70 and 72.

The resulting load cell block 40 can then be fitted with strain gauges and mounted within its application. Although the present load cell was designed for use with vehicles, and, in particular, logging trucks, it is applicable to any fixed or portable weighing system.

While a preferred embodiment of the invention has been illustrated and described herein, it is to be understood that various changes may be made without departing from the spirit and scope of the invention. For instance, the second pair of holes 54 may be formed such that when the slots 56 are created, there will be no upper grooves 70. This can be done by having the second pair of holes 54 formed of a smaller diameter than the predetermined diameter of the first pair of holes 52 and drilled at a position to have the bottom 74 of the second pair of holes 54 rest in the same plane as the bottom 76 of the first of holes 52. When the slots 56 are formed, the band saw blade will pass through the upper half of the second pair of holes 54, leaving only the bottom half to form the lower longitudinal grooves 72. Furthermore, the second pair of holes may be eliminated if it is desirable to not concentrate the bending forces at one location, or the diameter of the second pair of holes may be larger than the diameter of the first pair of holes to increase the size of the grooves. Consequently, the scope and extent of the present invention is to be interpreted in accordance with the appended claims.

The embodiments of the invention in which an exclusive property or privilege is claimed are defined as follows:

1. In a load cell assembly providing part of a weighing system having a load-supporting member and a mounting member, the load cell assembly being adapted to be positioned between the load-supporting member and the mounting member and including an elongated block having first and second ends, the block further including a central portion, a pair of lower beams extending outwardly from said central portion to be secured to the mounting member for maintaining the central portion of the block above the mounting member, and a pair of upper beams extending outwardly from said central portion to be secured to the load-supporting member for directing the applied load to the central portion, the upper beams having a lower longitudinal surface and the lower beams having an upper longitudinal surface, the upper and lower longitudinal surfaces defining a slot that extends inwardly from said first and second ends and terminates at an innermost end at the central portion, the improvement comprising:

a longitudinal bore drilled at the innermost end of said pair of slots and having a diameter greater than the distance between the upper and lower longitudinal surfaces.

2. The improvement of claim 1, wherein said bore has a smooth finish that eliminates machining marks to reduce the formation of stress cracks.

3. The improvement of claim 1, further comprising a groove means formed in the longitudinal face of each of said lower beams that is parallel to and spaced a predetermined distance from said longitudinal bore for concentrating bending forces at said groove means.

4. The improvement of claim 3, wherein said longitudinal groove means comprises a groove having a uniform arcuate cross-sectional shape.

5. The improvement of claim 4, wherein said longitudinal bore and said groove have a smooth finish that eliminates machining marks to reduce the formation of stress cracks.

6. An improved load cell construction for weighing systems having a load-supporting member and a mounting member, the improved load cell comprising an elongate block means having a first end, a second end, and a slot extending inwardly from each of said first and second ends to define upper and lower beams extending from a central portion, each slot having an upper wall formed by said upper beam, a lower wall formed by said lower beam, and an end wall formed by said central portion, each of said end walls being formed by a bore that is perpendicular to the longitudinal axis of said elongate block means and having a diameter greater than the distance between said upper and lower walls such that each of said end walls has a uniform arcuate cross-sectional shape.

7. The improved load cell of claim 6, wherein said bore has a smooth finish that eliminates machining marks to reduce the formation of stress cracks.

8. The improved load cell of claim 6, further comprising a groove means formed in the lower wall of each slot that is parallel to and spaced a predetermined distance from said bore for concentrating bending forces in said lower beam.

9. The improved load cell of claim 8, wherein said groove means comprises a groove having a uniform arcuate cross-sectional shape.

10. The improved load cell of claim 9, wherein said bore and said groove each have a smooth finish that eliminates machining marks to reduce the formation of stress cracks.

* * * * *